J. A. GENDRON.
SHUTTLE MOTION FOR LOOMS.
APPLICATION FILED SEPT. 16, 1908.

928,440.

Patented July 20, 1909.
7 SHEETS—SHEET 3.

J. A. GENDRON.
SHUTTLE MOTION FOR LOOMS.
APPLICATION FILED SEPT. 16, 1908.

928,440.

Patented July 20, 1909.
7 SHEETS—SHEET 4.

Witnesses
Oliver W. Holmes
J. J. Sheehy Jr.

Inventor
J. A. Gendron
By James J. Sheehy
Attorney

J. A. GENDRON.
SHUTTLE MOTION FOR LOOMS.
APPLICATION FILED SEPT. 16, 1908.

928,440.

Patented July 20, 1909.
7 SHEETS—SHEET 5.

UNITED STATES PATENT OFFICE.

JOSEPH A. GENDRON, OF NASHUA, NEW HAMPSHIRE.

SHUTTLE-MOTION FOR LOOMS.

No. 928,440.  Specification of Letters Patent.  Patented July 20, 1909.

Application filed September 16, 1908. Serial No. 453,301.

*To all whom it may concern:*

Be it known that I, JOSEPH A. GENDRON, a citizen of the United States, residing at Nashua, in the county of Hillsboro and State of New Hampshire, have invented new and useful Improvements in Shuttle-Motions for Looms, of which the following is a specification.

My invention pertains to looms and more particularly to shuttle motions of the type in which the shuttle is positively moved from one end of the lay to the middle thereof by one means and is then moved to the other end of the lay by a second means; and it has for one of its objects to provide shuttle-moving means of the kind defined, movable by the lay, but arranged to remain idle during the initial rearward movement of the lay, this in order to assure the retention of the shuttle at one end or the other of the lay incidental to the opening of the shed.

Another object of my invention is the provision in combination with the lay and the shuttle-moving means movable by the lay but arranged to remain idle during the initial portion of the rearward movement of the lay, of a reed movable rearwardly of the lay and by the lay during the said period of idleness of the shuttle-moving means, whereby the reed is positioned for its forward working stroke and out of the path of the shuttle-moving means precedent to the inward movement of said means.

Another object is the provision of tension means, adapted to assist in the movement of the shuttle-moving means in both directions and in that way contribute to the ease of operation of the mechanism as a whole.

Another object is the provision of a lock for positively engaging and securely holding the shuttle in the shuttle moving means to assure movement of the shuttle with said means until the same reaches the point at which it is essential to release the shuttle, and assure its being engaged by the other holder.

Other objects are to simplify the construction of the shuttle-holders of the shuttle-moving means, and to so alter the construction and arrangement of the mechanism for reciprocating the shuttle-moving means that such means may be located at the opposite side of the lay, with reference to the breast beam.

With the foregoing in view, the invention will be fully understood from the following description and claims when the same are read in connection with the drawings, accompanying and forming part of this specification, in which:

Similar reference numerals and letters designate corresponding parts in all of the views of the drawings, referring to which.

1 represents the forward portion of the frame of a loom, 2 represents the breast-beam, and 3 represents the lay supported by swords 4 which swing about the rod 5. 6 represents the operating crank shaft, and 7 the cranks which are connected through pins 8 and links 9 with the lay for the purpose of oscillating the same toward and from the breast-beam. Mounted on the ends of the lay are shuttle carriers 10 comprised in my novel shuttle-moving means and to which are connected links 11 for the purpose of reciprocating them toward and from each other longitudinally of the lay. As thus described, the parts are the same as shown in my Patent No. 845,345, of February 26, 1907. The connections through which the oscillation of the lay reciprocates the carriers are, however, different. The ends of the links 11 are connected to levers 12 which are pivoted at 13 to holders 14 which swing about horizontal pivots held in brackets 15 which are fastened to a cross bar 16 of the loom frame. Each of the levers 12 has an arm 17 extending inwardly and provided with a cam slot 18. Into the latter extends a pin or roll 19 carried by the lay. This slot extends throughout the greater part of its length in a direction transverse to the movement of the lay. Consequently the latter causes the lever 12 to oscillate about its pivot 13 and through link 11 to reciprocate the carrier. The slot 18 has a portion 18ª here shown as near its end, which extends in the line of movement of pin 19 when the lay is nearest to the breast-beam. The provision of the portion 18ª in the slot 18 constitutes an important feature of my invention inasmuch as it permits the lay to move an adequate distance rearwardly without movement of the lever 12 or the shuttle-carrier connected therewith, and hence assures the retention of the shuttle at the end of the lay incidental to the opening of the shed. Said provision is also important since it assures the retention of the shuttle-carrier at the end of the lay during the rearward movement of the reed, presently described, on the lay.

It is to be understood that the foregoing description applies to each of the devices on opposite sides of the center of the loom, these devices being in all respects similar to to each other and symmetrically and oppositely arranged. It should be further noted that the above described construction brings those connections which operate the shuttle between the lay and the driving shaft 6, that is, on the opposite side of the lay from the breast-beam. This leaves a clear space between the latter and the lay.

Figure 7:
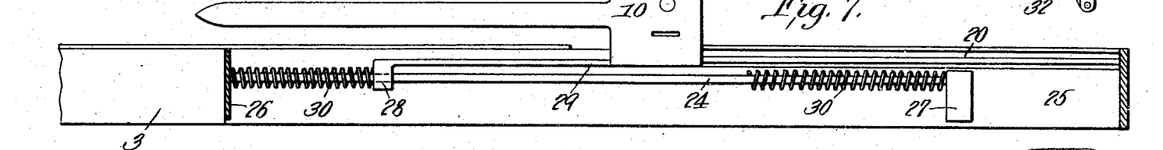
Fig. 7 is a detail section showing the carrier of one shuttle-moving means and the springs for assisting in the movements of said carrier in opposite directions.
Figures 19, 20, 21:
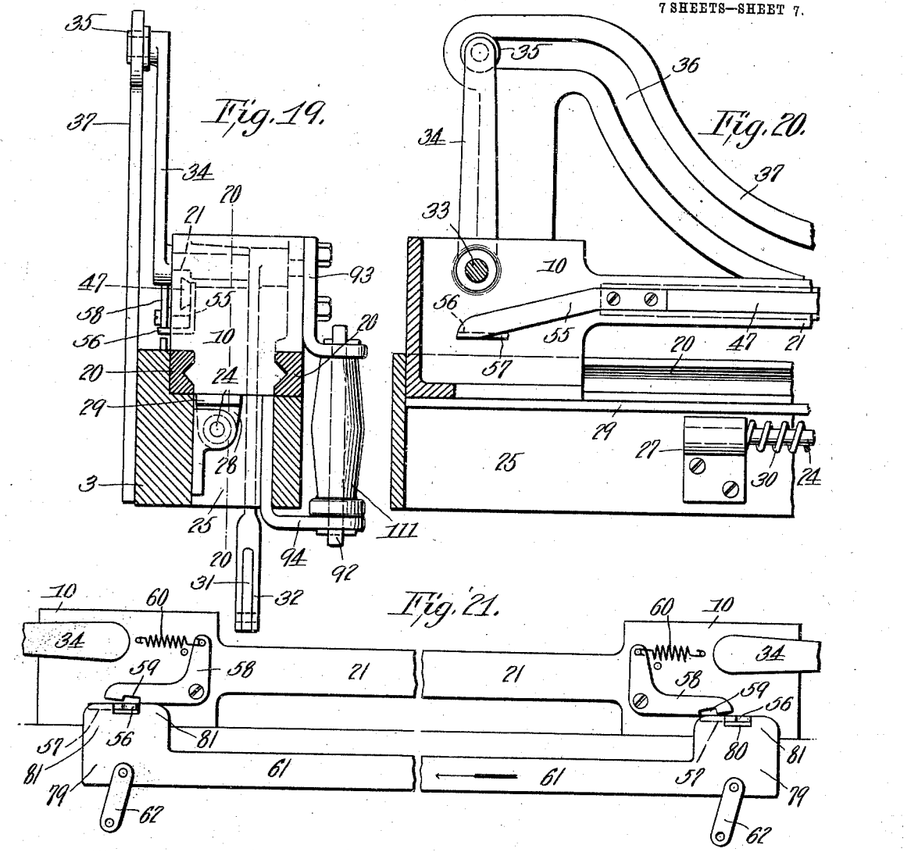
Fig. 19 is an enlarged section, taken transversely through the lay near one end thereof.
Fig. 20 is a detail section taken in the plane of the line 20—20 of Fig. 19, looking in the direction indicated by arrow.
Figs. 21 and 22 are broken elevations illustrating two positions of the lock-operating mechanism when the working member thereof is moving in different directions.

Taking up the construction of the shuttle carrier, reference may be had to Figs. 7, 19 and 20 which show the same most clearly. These figures show only one of the carriers, and only those other parts which are associated with this carrier, but it is to be understood that wherever a description is given of the parts adjacent one end of the lay, the same applies equally to the corresponding parts at the other end of the lay. The carrier then consists of a box-like structure shown at 10 which rises above the lay and of which the lower portion enters between guides 20 set into the lay on opposite sides of a wide slot in the end thereof. These guides have V-shaped longitudinal grooves opposite each other into which extend V-shaped ribs on the carrier. Projecting inward from one side of the carrier toward the center of the loom is an arm 21 forming a guide for a slidable shuttle holder 22 which serves in combination with the carrier to form one of the shuttle moving means. The shuttle holder has upper and lower lugs 23, Fig. 11, embracing the edges of the arm so as to retain the holder thereon. As the arm, the shuttle holder and the shuttle, when held within the holder, are all raised above the lay so as to pass between the warp threads, it is necessary to give an additional support for them to prevent the carrier 10 cramping in the guides 20. This support is given by a rod 24 located in the slot 25 in the end of the lay and extending between a plate 26 at the inner end of the slot and a bracket 27, fixed to the lay. This supporting rod is surrounded by a collar 28, Fig. 19, on the end of an arm 29 projecting rigidly from the bottom of the carrier 10. Springs 30 surround opposite end portions of the supporting rod 24, and are engaged by the collar 28 at each limit of the carrier's reciprocation. The said springs 30 have for their office to start—i. e., impart initial impulses to, the carrier 10 when the same is moved by the means before described, and in that way contribute to the reliability and ease of operation of the mechanism as a whole.

Figure 6:
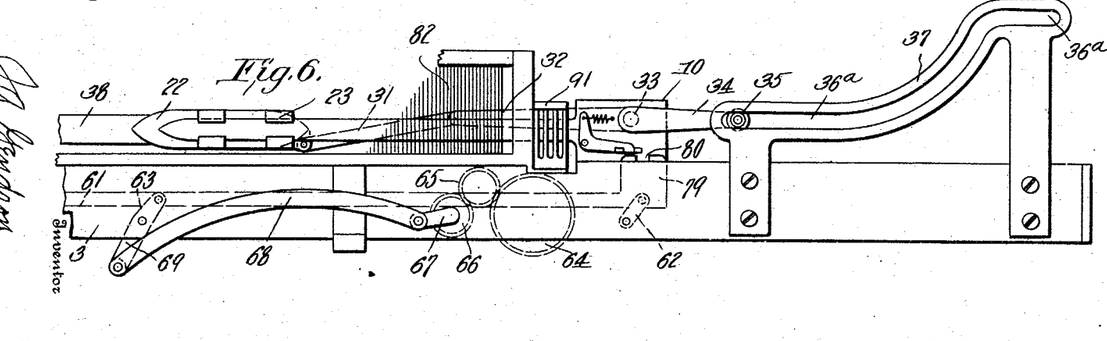
Fig. 6 is a similar view showing the same parts in different positions.

The shuttle-holder 22 is moved longitudinally on the arm 21 of carrier 10 by a link 31, Fig. 6, and an arm 32 secured upon a rock shaft 33 passing through the carrier 10. On the outside of the carrier 10 an arm 34 extends at a right angle from the rock-shaft and carries on its end a roll or pin 35 entering the slot 36 in a plate 37 secured to the side of the lay. The end portions 36ª of the said slot 36 are straight and are arranged parallel to each other and the line of movement of the guide 10 and holder 22 in order to enable the springs 30 to perform the function hereinbefore ascribed to the same, while the intermediate portion of the slot, which is curved downward and toward the center of the loom serves to retard the roller 35 when the carrier 10 moves, thereby turning the rock-shaft 33 and swinging the arm 32 in the same direction that the carrier 10 is moving. This advances and retracts the holder 22, supplementing the movement of the carrier 10 by the length of the rocker arm 32.

Figures 10, 11, 12, 13:
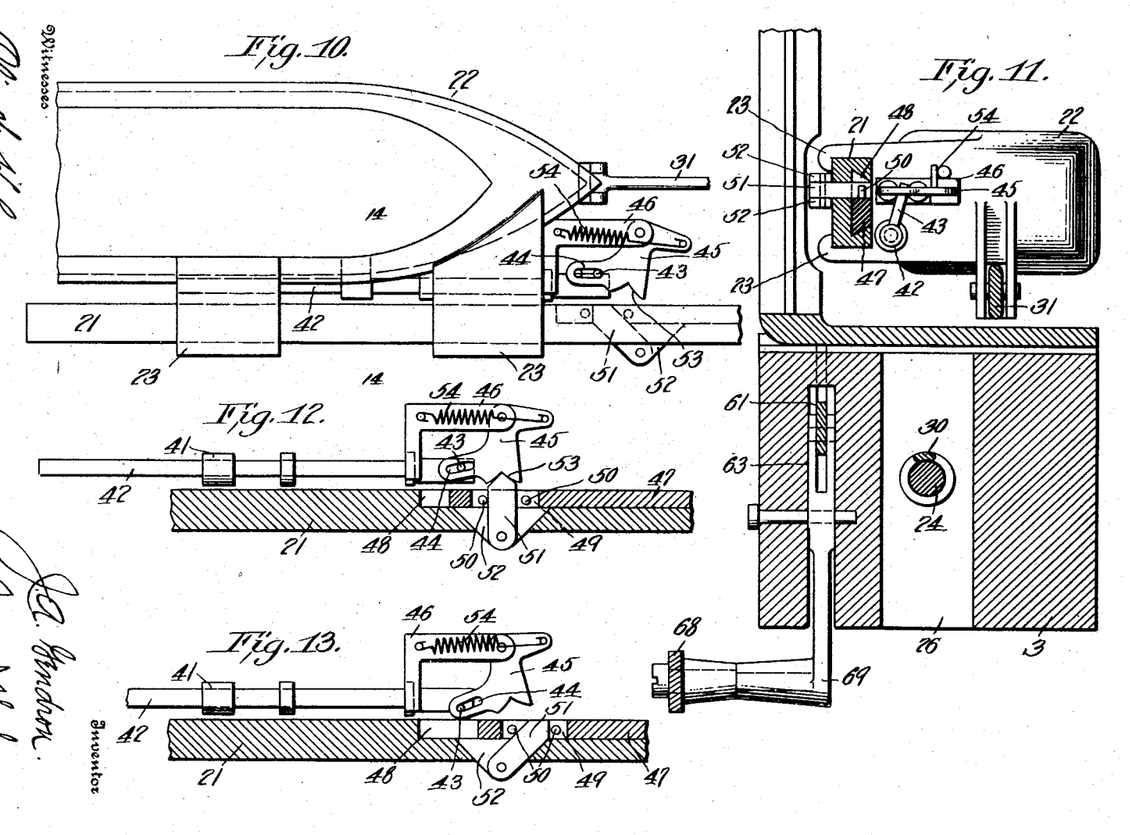
Fig. 10 is an enlarged detail plan showing a portion of the shuttle-holder of one shuttle-moving means, the carrier of said means, and the shuttle lock.
Fig. 11 is a cross-section taken in a plane at the right of Fig. 10.
Figs. 12 and 13 show the mechanism for operating the shuttle-lock, in different positions.

A lock is provided for positively retaining the shuttle within the holder 22. See Figs. 14 and 15, wherein 38 represents the shuttle which has a recess 39 in one side protected by a wear-plate 40 into which projects the end of a latch 41 secured upon a rocker rod or shaft 42. The latter as shown in Fig. 10, passes through and is held rotatably in the blocks from which the lugs 23 extend, and has a pin 43 extending upwardly from a point near its outer end. This pin passes into a slot 44 formed in one of the arms of an operating lever 45 which is pivoted to a bracket 46 secured to the shuttle holder. As the lever 45 is oscillated from one side to the other, the edges of its slot act as cams which swing the pin 43 from side to side, and thereby retracts and advances the latch 41. For convenience the lever 45 may be referred to as the operator.

The last described parts are all carried by and moved with the shuttle holder 22. For actuating them I provide a bar 47, which may be known as the actuator and is held in a longitudinal undercut slot 48 in the arm 21. This bar has a recess 49, Fig. 12, in which are set pins 50 spaced sufficiently far apart to receive between them a swinging dog 51 pivoted between ears 52 on the arm 21 and having its end extending beyond the forward side of the latter. This dog is located adjacent the point where the operator 45 lies when the shuttle-holder is in its most advanced position toward the end of the arm 21. Thereupon if the actuator bar 47 is moved, one or the other pins 50 engages the dog 51, swinging the latter and causing its pointed end to enter a notch 53 in the lever 45, thereby swinging the latter and either withdrawing or advancing the latch 41, depending on the direction in which it moves. After being released by the dog, lever 45 is held in either of its extreme positions with one of the ends of the slot bearing against pin 43, by means of a spring 54 which passes between pins on the bracket 46 and lever 45, respectively. These pins are so arranged that the spring is carried to opposite sides of the lever's pivot during each full swing of the latter. Figs. 10 and 13 illustrate the opposite extremes of movement of these parts, while Fig. 12 shows them in mid-position.

Upon the outer end of the bar 47 is a strip or plate 55, Fig. 20, which has on its end a tongue 56 projecting through a slot 57 in the side of the carrier 10. On the outside of the latter is pivoted a latch lever 58 which has a notch 59 in the arm nearest the tongue 56. A spring 60 acts on the other arm of the lever and tends to move it so as either to engage the notch over the tongue 56 or to bring its end down beside the tongue, and hold the latter against the outer end of the slot, depending on the position of bar 47. Thus the actuator bar is normally locked in either of its extreme positions.

Figure 1:
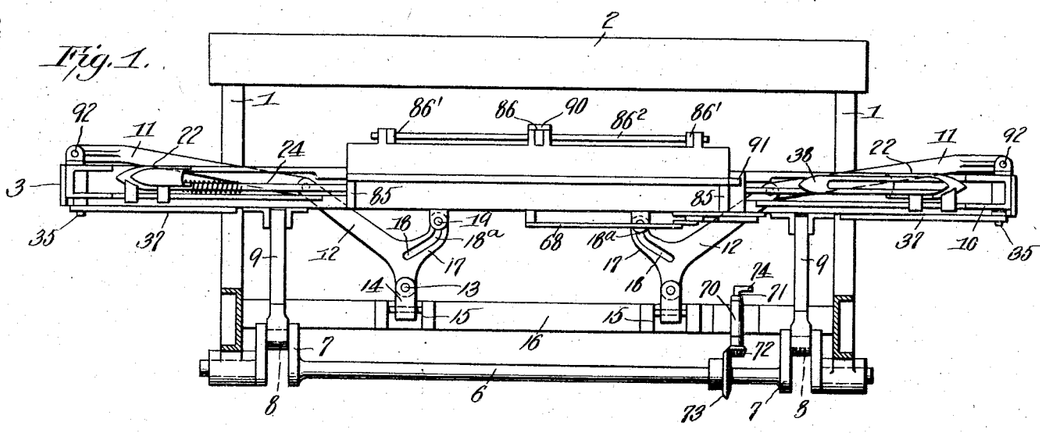
Figures 1 and 2 are plan views of a portion of a loom constructed in accordance with my invention and showing the working parts in the two extremes of their movements.
Figure 2:
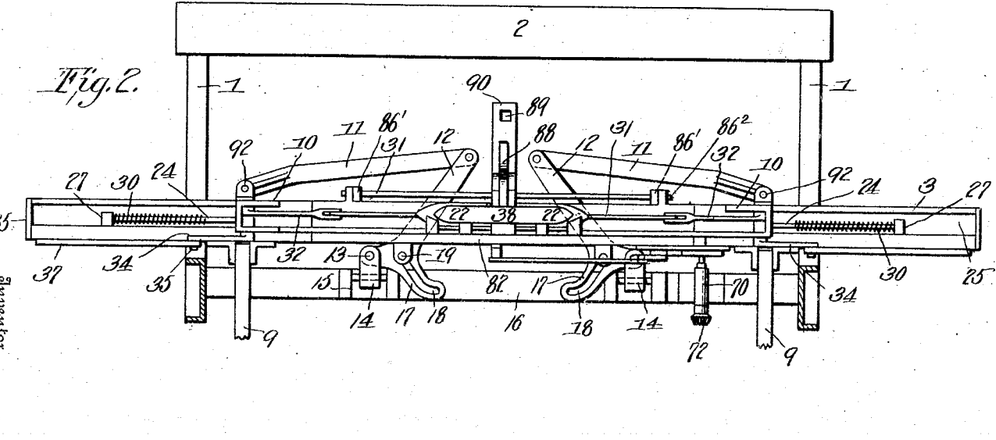
Figure 5:
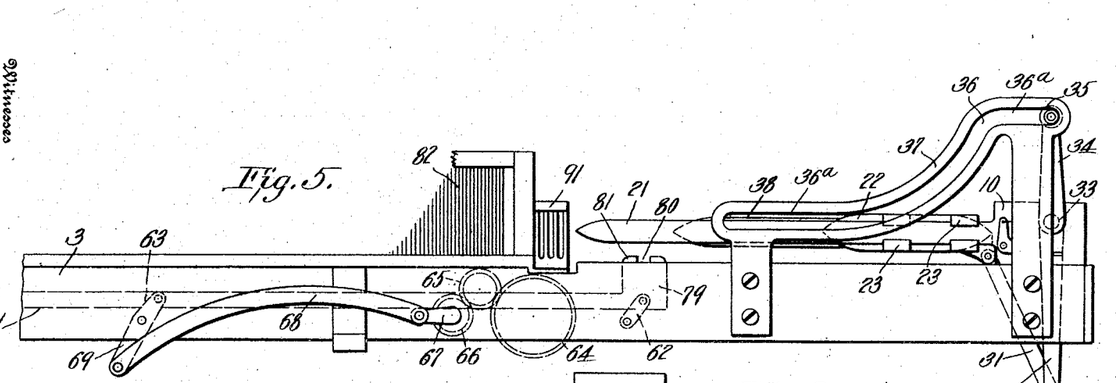
Fig. 5 is an enlarged rear elevation of one end of the lay showing one of the two shuttle-moving means and the mechanism for operating the lock thereof.
Figures 16, 17:
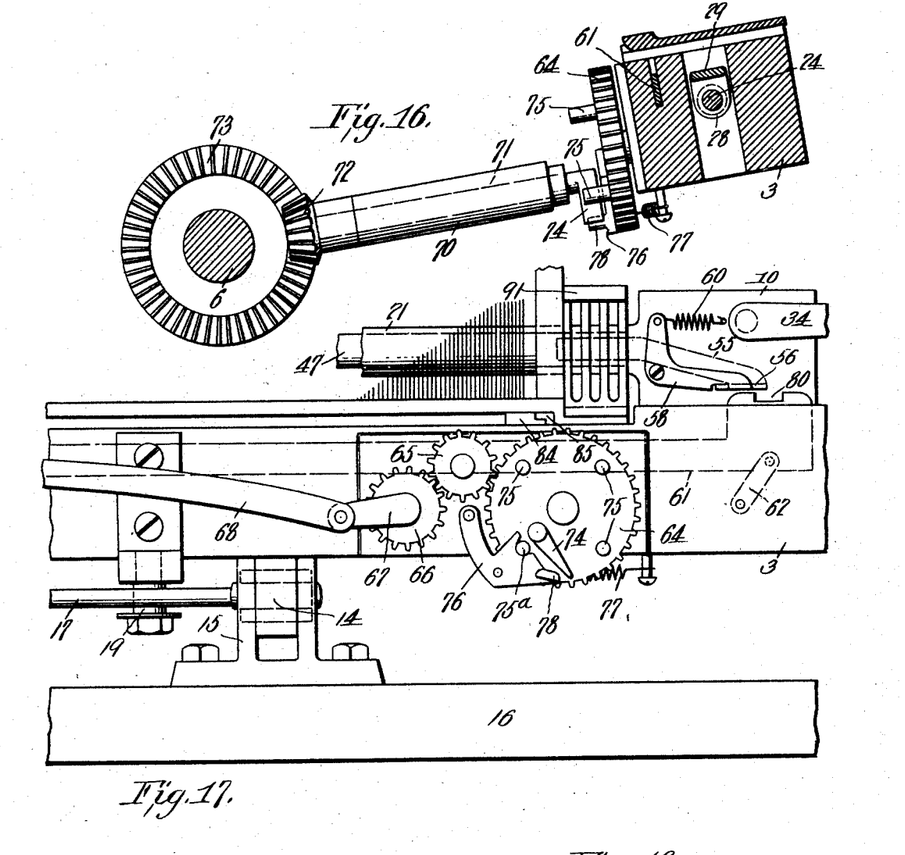
Fig. 16 is an enlarged detail view showing the driving mechanism which operates the shuttle lock.
Fig. 17 is a detail view of the lock-operating mechanism.
Figure 18:
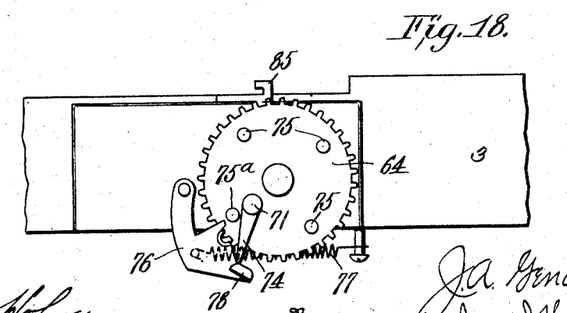
Fig. 18 is a detail view of the intermittent gear wheel, the detent therefor, and the driving arm comprised in the lock-operating mechanism.

Mechanism is carried by the lay for releasing the latch lever 58 and moving the actuator 47. This mechanism consists of a longitudinal bar 61 which is pivoted to the lay by short parallel links 62 adjacent its ends and by a lever arm 63 of the same length at its center, Figs. 5 and 6. The longitudinal bar is reciprocated at the proper times by an intermittently moved wheel 64 having gear teeth meshing through the interposition of an idler 65 with a pinion 66 which carries a crank 67 pivoted to a link 68. The latter is connected to an arm 69 integral with the lever arm 63. These parts are all moved one step whenever the lay approaches the driving shaft 6, the motive power being derived from this shaft. As illustrated in Figs. 1, 2 and 16, there is mounted on the cross bar 16, a bracket containing a bearing 70 for a stud shaft 71 which carries at one end a bevel pinion 72 meshing with a bevel pinion 73 on the shaft 6, and at the other end a rotary arm 74. On the face of the wheel 64 are several pins 75 which extend into the plane of rotation of the arm 74 when the lay is nearest to the crank-shaft. The gearing 72 73 is so proportioned that driver arm 74 will rotate rapidly and travel through a large proportion of rotation during the period that the lay pauses, while the cranks 7 and links 9 pass the dead-point. The shaft 71 is eccentric of wheel 64, as shown in Figs. 17 and 18. Therefore the driver arm lies nearer one of these pins than to the others. Thus it will just clear all those pins except the one designated 75$^a$ in Fig. 17. This one it will engage, and through it move the wheel 64 through that fraction of a revolution which is the reciprocal of the number of pins, passing out of engagement with the pin or an antifriction roller thereon when this amount of movement has been given to it. The mechanism is then locked by a pivoted detent or latch 76 having a notch which is normally drawn over and into engagement by the spring 77. There is also a nose 78 on the latch which is in the path of the driver arm 74 and is struck by the latter, being retracted thereby sufficiently to disengage the notch of the latch from the pin. The sizes of the wheel 64 and pinion 66 are so proportioned with reference to the number of pins 75 that the pinion 66 will turn through exactly half a revolution as a result of the movement given by the driver arm 74. This throws the crank 67 from left to right of the pinion axis and vice versa, thereby moving the bar 61 from one of its extreme positions to the other. Thus when the lay returns adjacent the driving shaft on one trip, the longitudinal bar 61 is moved, say, to the right, remaining there until the lay makes a complete round trip, and again approaches the crank-shaft, whereupon the bar 61 is thrown to the left, this order of steps following in regular succession.

Figure 22:
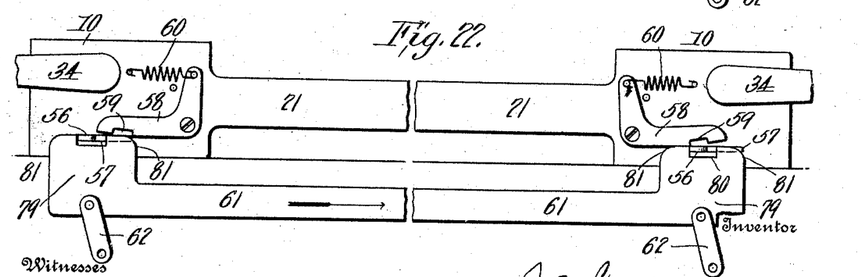

On each end of the bar 61 are projections 79, each of which has at its upper edge a notch 80 flanked by teeth 81. These normally lie beneath and in the same vertical plane with the latch 58 and tongue 56. By reason of the linked connection with the lay, bar 61 when being reciprocated longitudinally is also given an up-and-down swinging movement which carries its teeth upward, then longitudinally of the lay, and then downward. These movements in each direction are illustrated in Figs. 21 and 22. During the first part of the movement, one of the teeth engages the lever 58 and lifts it out of the way of tongue 56. The other tooth then moves laterally and engages tongue 56 while the locking lever 58 is out of the way, moving it either to the left or right, as the case may be, finally withdrawing downward, leaving the tongue 56 and allowing the latch 58 to drop and lock the same as hereinbefore described. The movement which is given to the tongue 56 by bar 61 is sufficient to move the actuator 47 from the position of Fig. 13 to that of Fig. 10, or vice versa, thereby swinging the latch operator 45 and either releasing or projecting the latch 41.

As the locks and the operating mechanisms therefor carried by the respective shuttle carriers at opposite ends of the lay are the reverse, one of the other, while both ends of the bar 61 move simultaneously in the same direction, it will be understood that the several lock-operating mechanisms are moved in the same direction, but with reverse effect, thereby retracting one lock when the other is projected. This enables the transference of the shuttle to be made from one carrier to the other and secured positively to the latter. The motions of the locks are reversed on alternate movements of the lay.

Figures 8, 14, 15:
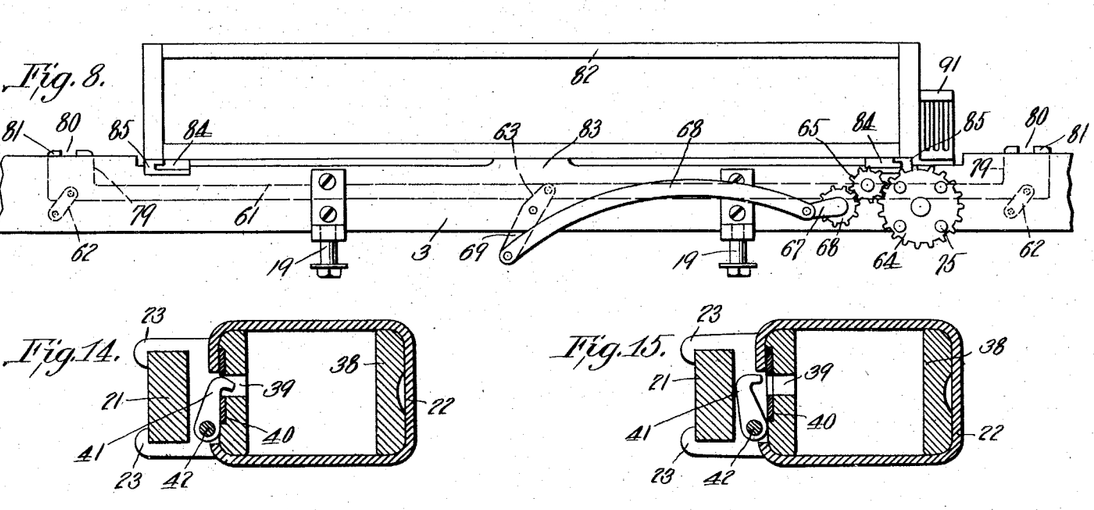
Figs. 8 and 9 are detail views illustrating the lock-operating mechanism in two different positions.
Figs. 14 and 15 are sections taken on the line 14—14 of Fig. 10 and showing the shuttle lock in different positions.
Figure 9:
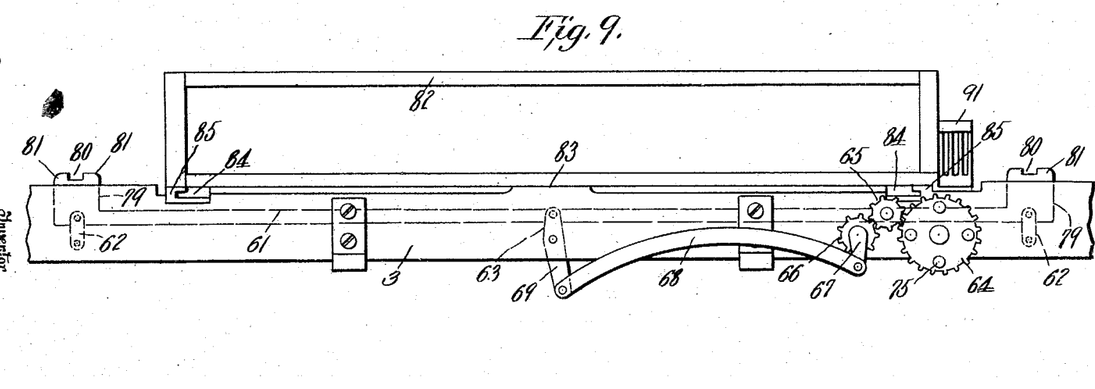

On the top of the lay is supported the usual reed 82 of which the center is supported by a raised shoulder 83 of the lay, Fig. 8, and the ends of the frame of the reed have on their under sides tongue plates 84 which enter grooves in the plates 85 mounted upon the lay. These tongues and grooves extend transversely of the latter and enable the reed to move back and forth in said direction. This movement takes place when the lay is near the end of its motion toward the breast-beam, and is produced by a lever 86, fixed on a rock shaft $86^2$, journaled in a bracket 87 projecting from the front of the lay. Said lever 86 has a forwardly and downwardly extending arm 88. This arm passes into a perforation 89 in a plate or bar 90 which projects from the cross-bar 16. The walls of the perforation act as abutments to arrest the lower arm of the lever, causing its upper arm to be advanced more rapidly than the lay, and thereby to draw the reed from the rear edge to the forward edge of the lay. In other words, from the rear side to the forward side of the path in which the shuttle moves. On the return movement, the rear edge of the perforation 89 arrests the lever arm 88 and retracts the reed to the rear side of the lay. The ends of the reed are acted upon by levers $86^1$ which are connected to the rock-shaft $86^2$, and hence fixed with respect to the lever 86. By means of the latter the rock-shaft is oscillated, and thereby levers $86^1$ are given a motion precisely similar to lever 86. Thus the reed is acted upon at its ends and center, being thereby prevented from getting out of line and cramping in its guides. The rearward movement of the reed takes place while the shuttle-moving means are at rest at the ends of the lay, in consequence of the disposition of the pins 19 in the portions $18^a$ of the slots 18, Fig. 1, and therefore the reed assumes a position ready for its forward working stroke and out of the path of the shuttle-moving means prior to the inward movement of said means. At one end of the reed frame is secured a grid 91 for the weft-fork which grid travels with the reed.

Figures 3, 4, 23, 24, 25, 26:
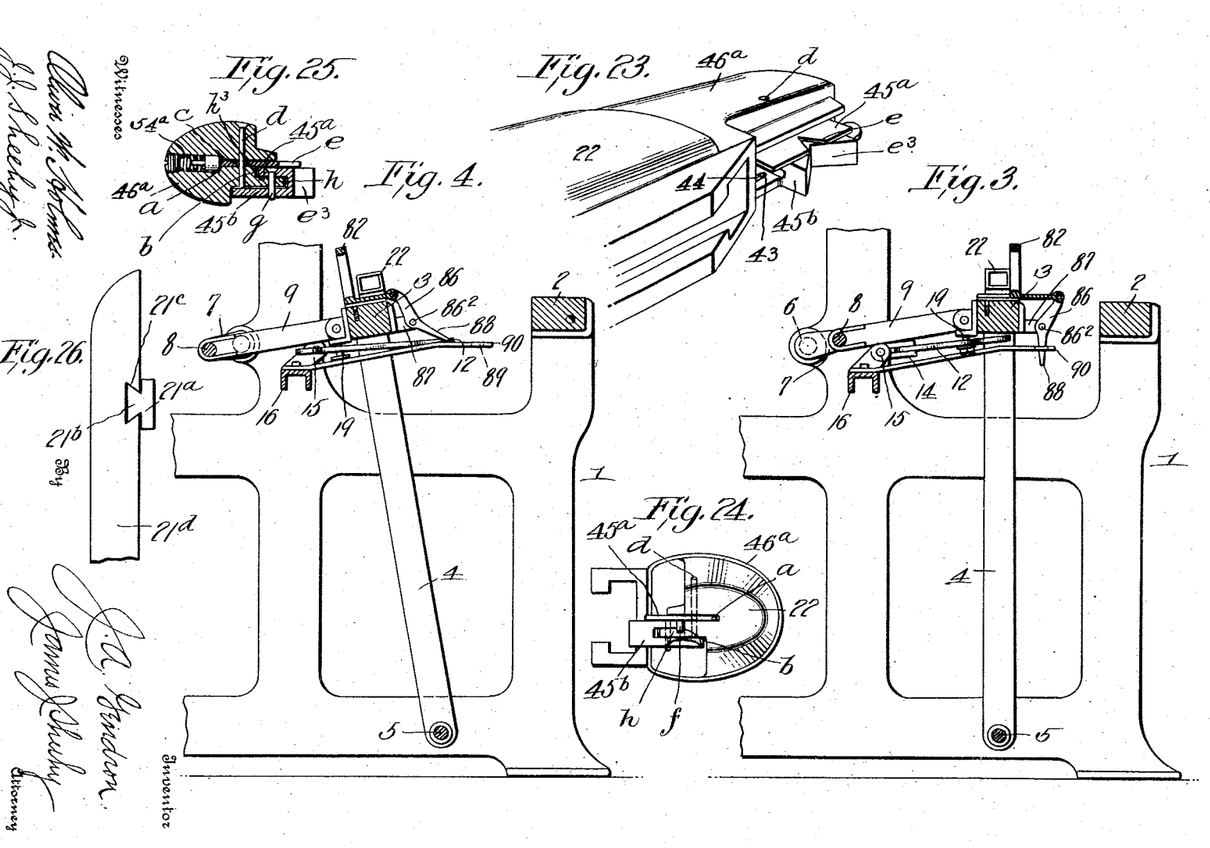
Figs. 3 and 4 are vertical sections of the same parts; the positions of the parts in Fig. 3 corresponding to the positions in Fig. 1, and the positions of the parts in Fig. 4 corresponding to the positions in Fig. 2.
Figs. 23, 24 and 25 are views of an advantageous, substitute detail construction which may be employed in the discretion of a manufacturer building a loom in accordance with my invention.
Fig. 26 is a view of another substitute detail construction.

On reference to Figs. 3, 4 and 17 it will be observed that the pins 19 carried by the lay are of greater length than the thickness of the levers 12, and that the pivoted holders 14 in which the latter are pivotally mounted enable them to swing vertically. Thus the difference in the height of the lay caused by the circular path in which it swings, is compensated for. In order to hold the links 11 firmly they are provided with wide hub portions 111, Fig. 19, which are bored to receive the pivots 92 by which they are connected with the carriers 10. The pivots are held at their opposite ends in brackets 93 and 94 projecting downward and outward from the outer and inner surfaces of the box-like carrier. The wide bearing thus provided between the long pin 92 and the boss 111 holds the link 11 firmly and also assists in supporting the lever 12.

The operation of the mechanism described is as follows: While the lay is in the position illustrated in Figs. 2 and 4, the shuttle carriers are at the limit of their motion, and the transfer of the shuttle is effected. Then as the lay moves toward the breast-beam, the shuttle-carriers retract, carrying the shuttle in the holder of one of them, while the lay carries the reed forward to beat upon the thread left by the shuttle. As the lay nears the limit of its motion, the arm 88 of lever 86 enters the orifice in the bar 90 and causes the reed to be moved forward with a sharp and sudden motion, beating the last thread firmly into the web. The lay then begins to move backward on account of the cranks 7 passing the dead-point, and during the period in which the pins 19 remain in the perpendicular portions $18^a$ of the cam slots 18, the reed is retracted by the lever 86. By the time the reed has reached the position shown in Fig. 4, the pins reach the inclined portions of the slots 18 and swing the levers 12 inwardly to move the shuttle carriers toward one another. This movement is augmented by that of the shuttle-holders which are simultaneously slid along the arms 21 by the action of the levers 32 and 34, the links 31 and the cams 36. Then by the time the lay reaches its extreme of movement and pauses while the cranks pass the other dead-point, the rotating arm 74 engages one of the pins 75 of the gear 64 so as to throw over the bar 61 and operate the shuttle locks, releasing the shuttle from the holder in which it has been held, and engaging it with the other shuttle-holder. All is in readiness then to repeat the cycles of operations.

It will be noted here that the described retention of the shuttle at one end or the other of the lay is materially advantageous because it affords weft-replenishing mechanism ample time to replace an empty bobbin with a full one. It will also be noted that the peculiar slot in the plate 37 is further advantageous because the roller 35 when in the curved intermediate portion of the slot causes the shuttle holder to move approximately three times faster than when said roller 35 is in the straight end portions, thus avoiding shock at the ends of the movements of the shuttle-holder. It will further be noted that the reed travels forwardly to beat up the thread, to such an extent as to make a longer warp thread in front of the reed, and permit of the shuttle passing through the warp thread without forcing the warp open, and consequently there is no danger of the warp thread being broken.

In Figs. 23, 24 and 25, I have illustrated a slidable plate $45^a$, a lever $45^b$ and a tension-creating device $54^a$ designed to coöperate with a dog like the dog 51 in Figs. 10–13, and to be used, in the discretion of the manufacturer of my improvements, in lieu of the lever 45 and spring 54 of Figs. 10–13. Referring particularly to said Figs. 23, 24 and 25: $46^a$ is a bracket fixed to the shuttle-holder 22 and having a guide-way $a$ and a shoulder $b$ at one side thereof. The plate $45^a$ is arranged and adapted to move longitudinally in the slot $a$ and is provided with a longitudinal, transversely disposed slot $c$ for the reception of a transverse pin $d$ by which it is retained in the guide-way $a$ and limited in its movements, and is also provided with a notch $e$ and two lateral studs $f$, the latter designed to move on the shoulder $b$ in the direction of the length thereof. The lever $45^b$ is fulcrumed at $g$ on a projection $h$ at one side of the guide-way $a$ and is provided with a rounded portion $h^3$, opposed to the shoulder $b$ and arranged between the studs $f$ of the slidable plate $45^a$. Said lever $45^b$ is further provided with a notch $e^3$ and a slot 44, Fig. 23, the latter to receive a pin 43 on a rock-shaft similar to and for the same purpose as the shaft 42, Figs. 10 to 13. The tension device $54^a$, Fig. 25, is made up of a plunger arranged in a socket in the bracket $46^a$ and against the inner edge of the plate $45^a$, a plug closing the outer end of the socket, and a spring interposed between the plunger and the plug and designed to yieldingly press the plunger against the plate and hold the latter under tension.

In the practical use of the foregoing modified construction, it will be seen that when the lever $45^b$ is rocked in one direction and the plate $45^a$ is moved in the same direction by the dog 51, one of the studs $f$ on plate $45^a$ will be wedged in front of the rounded portion $h^3$ of the lever $45^b$, and in consequence of the plate $45^a$ being under tension the lever $45^b$ will be securely held until the lever and the plate are moved in the opposite direction by the dog 51. On this latter movement of lever and plate the other stud $f$ of the plate will be wedged back of the rounded portion $h^3$ of the lever and hence the latter will be held against movement until the lever and plate are again moved in the first named direction.

It will be gathered from the foregoing that the construction shown in Figs. 23 to 25 is certain in its operation and embodies no parts that are likely to jump out of place or get out of order incidental to the use of the improvements.

In lieu of making the arms 21 of the shuttle-carriers 10 of oblong form in cross-section outline, Fig. 11, I may, without involving departure from the scope of my claimed invention, make the said arms of the cross-section outline shown in Fig. 26, in which the arm $21^a$ is shown as provided with a dovetail rib $21^b$, and the said rib is disposed and movable in a correspondingly-shaped recess $21^c$ formed in a post $21^d$ carried by the lay. This construction is advantageous inasmuch as it renders the arm $21^a$ steady and firm when the machine is in operation.

Having described my invention, what I claim and desire to secure by Letters-Patent, is:

1. In a positive-shuttle-motion loom, the combination of a lay, two shuttle moving means mounted to travel along the lay, means having operative connection with the lay and adapted to be moved by the lay only after the first portions of the rearward movements and before the last portions of the forward movements of the lay, for reciprocating the shuttle-moving means, to assure the retention of the shuttle at one end or the other of the lay incidental to the opening of the shed, and a reed movable rearwardly and transversely of the lay and by the movement of the lay during the said period of idleness of the shuttle-moving means, whereby the reed is positioned for its forward working stroke and out of the path of the shuttle-moving means precedent to the inward movement of said means.

2. In a positive-shuttle-motion loom, the combination of a lay, two shuttle-moving means mounted to travel along the lay, means having operative connection with the lay and adapted to be moved by the lay only after the first portions of the rearward movements and before the last portions of the forward movements of the lay, for reciprocating the shuttle-moving means, to assure the retention of the shuttle at one end or the other of the lay incidental to the opening of the shed, and tension means for assisting in the starting of the shuttle-moving means in both directions.

3. A positive-shuttle motion loom, including a lay, a shuttle in which is a recess, shuttle-carriers mounted to travel along the lay, connections between said carriers and a part of the loom with respect to which the lay is movable, for reciprocating the carriers; said connections being adapted to be moved by the lay only after the first portions of the rearward movements and before the last portions of the forward movements of the lay, a lock on each carrier adapted to move in and out of the recess in the shuttle, devices on each carrier for operating said lock and holding it alternately in and out of said recess, and mechanism on a part of the machine with respect to which the lay is movable, constantly in motion and rendered operative when the lay is adjacent said part for actuating said devices to remove one lock from and put the other lock in the recess of the shuttle.

4. A positive-shuttle motion loom, including a lay, shuttle carriers mounted to travel along the lay, connections between said carriers and a part with respect to which the lay is movable, for reciprocating the carriers; said connections being adapted to be moved by the lay only after the first portions of the rearward movements and before the last portions of the forward movements of the lay, a lock on each carrier adapted to engage the shuttle, devices on each carrier for operating said lock and holding it alternately in and out of engagement with the shuttle, mechanism on a part with respect to which the lay is movable, constantly in motion and rendered operative when the lay is in proximity to said part for actuating said devices to release one lock and engage the other with the shuttle.

5. In a loom of the character described, the combination with the lay and shuttle carriers thereon, of connections interposed between the lay and a part toward and from which the lay is movable, on the opposite side of the lay from the breast-beam, consisting of levers pivotally connected to said part and having cam slots extending in the direction of motion of the lay and also inclined to such direction, links joining said levers with the carriers, and projections on the lay movable in the cam slots of the levers, for the purpose set forth.

6. In a loom of the character described, the combination with the lay and shuttle-carriers thereon, of connections interposed between the lay and a part of the loom toward and from which the lay is movable, on the opposite side of the lay from the breast-beam, consisting of levers pivotally connected to the said part and having slots, partly straight and partly cam, links joining said levers with the carriers, and projections on the lay movable in said slots.

7. In a loom of the character described, a lay, a part toward and from which the lay is movable, two shuttle-moving means mounted to travel along the lay, levers pivoted to the said part and having slots comprising portions extending in the direction of motion of the lay and portions inclined to said direction, links joining said levers with the shuttle moving means, and projections on the lay movable in said slots; the said levers being adapted to be moved by the lay only after the first portions of the rearward movements and before the last portions of the forward movements of the lay, for the purpose set forth.

8. In a loom of the character described, the combination of a lay, shuttle carriers, each of which has an arm, shuttle holders movably supported on and guided by the arms of the carriers, a rock-shaft and arm held by each carrier and connected with the respective holder, guides on the lay each having straight end portions arranged in parallel horizontal planes and an upwardly and outwardly extending portion connecting the adjacent ends of the straight portions, arms attached to said rock-shafts and having means engaged with said guides, and tension means for assisting in starting the carriers in opposite directions.

9. In a loom of the character described, a lay, carriers on the lay each having an arm extending longitudinally of the lay; a shuttle-holder mounted to slide on the arm of each carrier; a shuttle lock and operating means for projecting and retracting the same, carried by the holder; actuating means for the said operating means; including a bar sliding longitudinally of said carrier arm; a longitudinally-movable member arranged to operate said bar, and mechanism for so moving said member carried by the lay; and a power driver for operating said mechanism; said parts being so organized and arranged as to be brought into relation for transmitting motion only when the lay is retracted and the shuttle-holders are most closely adjacent each other.

10. In a loom of the character described, a lay, carriers on the lay, each having an arm extending longitudinally of the lay; a shuttle-holder mounted to slide on the arm of each carrier; a shuttle lock and operating means for projecting and retracting the same, carried by the holder; actuating means for the said operating means, including a bar sliding longitudinally in said carrier-arm; a latch mounted on the carrier normally holding said bar from movement; a longitudinally movable member having also an up-and-down motion simultaneously therewith, and mechanism for so moving said member, carried by the lay; projections on said member arranged to release the latch and move said bar; and a power driver for operating said mechanism; said parts being so organized and arranged as to be brought into relation for transmitting motion only when the lay is retracted and the shuttle-holders are most closely adjacent each other.

11. In a loom of the character described, a lay, carriers on the lay, each having an arm extending longitudinally of the lay; a shuttle-holder mounted to slide on the arm of each carrier; a shuttle lock and operating means for projecting and retracting the same, said means being carried by the holder and comprising parts 45$^a$ and 45$^b$ and a tension device; actuating means for the said operating means, including a bar sliding longitudinally of said carrier arm; a longitudinally movable member arranged to operate said bar, and mechanism for so moving said member, carried by the lay; and a power driver for operating said mechanism; said parts being so organized and arranged as to be brought into relation for transmitting motion only when the lay is retracted and the shuttle-holders are most closely adjacent each other.

12. A positive-shuttle-motion loom, including a lay, carriers mounted to travel along the lay, connections between said carriers and a stationary part of the loom through which the carriers are reciprocated together and apart by movements of the lay, a positive lock on each carrier adapted to engage the shuttle, devices on each carrier for operating said lock and holding it alternately in and out of engagement with the shuttle, mechanism on a fixed part of the machine, constantly in motion and rendered operative when the lay is most closely adjacent said fixed part for actuating said devices to release one lock and engage the other with the shuttle.

13. In a positive-shuttle-motion loom, a lay, shuttle carriers arranged to travel toward and from each other on the lay, a lock on each carrier actuable to engage the shuttle when the carriers are closest together, mechanism on the lay independent of the carriers to operate both locks simultaneously for engaging one with and releasing the other from the shuttle, and a constantly moving driver, on a part of the loom toward and from which the lay is moved, operative only when the lay is most nearly adjacent such part to actuate such mechanism, and thereby the locks, with a quick motion.

14. In a positive-shuttle-motion loom, a breast-beam, a lay, shuttle carriers arranged to travel toward and from each other on the lay, a lock on each carrier mounted to swing on an axis parallel with that of the shuttle and movable toward and from the latter to secure the same to, and release it from, the carrier, mechanism on the lay operating said locks to engage one with and simultaneously release the other from the shuttle, and a constantly-moving driver arranged to actuate said driver when the lay is most remote from the breast-beam.

15. In a positive-shuttle-motion loom, a lay, a lay-oscillating shaft, shuttle carriers arranged to travel toward and from each other on the lay, a shuttle lock and actuating connections therefor mounted on each carrier, and a rotary arm on a stationary part of the loom constantly driven by the lay-oscillating shaft for operating said connections to release one lock and engage the other with the shuttle.

16. In a positive-shuttle-motion loom, a lay, shuttle carriers arranged to travel toward and from each other on the lay, means controlled by the movement of the lay for causing such travel of the carriers, a shuttle lock and actuating connections therefor mounted on each carrier, mechanism carried by the lay arranged to act upon and operate said connections when the carriers are adjacent each other to release one and engage the other of said locks, and driving means on a fixed part of the loom located so as to engage and actuate said lay-carried mechanism with a quick motion only when the lay is close to such fixed part.

17. In a loom of the character described and in combination with the lay and the crank-shaft for oscillating the same, shuttle carriers reciprocable on the lay, connections between the lay and a fixed part of the loom for moving the carriers toward one another as the lay approaches the crank shaft, shuttle-securing locks mounted on the carrier, lock-operating mechanism carried by the lay arranged to cause alternate engagement and disengagement of the locks when the lay and carriers are at the inward limit of their travel, and a driver moving always in the same location normally disconnected from said lock-operating mechanism but arranged to engage and actuate the same at the time when the carriers are nearest each other.

18. In a loom of the character described, a lay, a crank shaft, a driver continuously rotated by the crank-shaft in a fixed location adjacent the inner limit of travel of the lay, a shuttle-lock-actuating mechanism carried by the lay having projections to be engaged and operated by said driver, shuttle carriers, locks, and means on the carriers so located and arranged as to be engaged by the mechanism on the lay when the carriers are most closely adjacent each other, during the operation of said mechanism by the driver, to engage one lock with and release the other from the shuttle alternately.

19. In a loom of the character described, a lay, shuttle carriers movable on the lay, shuttle holders mounted on the carriers and movable relatively thereto, a lock on each holder for securing the shuttle thereto, a lock operator carried by the holder, an actuator on each carrier arranged to engage and move said lock operator when the shuttle holder is most remote from the end of the lay, to alternately project and release the lock, mechanism carried by the lay arranged to engage and move said actuator, and a power-moved driver for operating said mechanism.

20. In a loom of the character described, a lay, shuttle-carriers movable on the lay, shuttle-holders mounted on the carriers and movable relatively thereto, a lock on each holder for securing the shuttle thereto, a lock operator carried by the holder, an actuator on each carrier arranged to engage and move said lock operator when the shuttle holder is most remote from the end of the lay, to alternately project and release the lock, a latch for securing said actuator in place and preventing accidental movement thereof, mechanism carried by the lay arranged to engage and release said latch, and then to move said actuator, and a power-moved driver for operating said mechanism.

21. In a loom of the character described, a lay, shuttle carriers movable on the lay, shuttle holders mounted on the carriers and movable relatively thereto, a lock on each holder for securing the shuttle thereto, a lock operator carried by the holder, an actuator on each carrier arranged to engage and move said lock operator when the shuttle-holder is most remote from the end of the lay, to alternately project and release the lock, a latch for securing said actuator in place and preventing accidental movement thereof, mechanism carried by the lay including a longitudinal member having upward and longitudinal movements and projections for lifting said latch out of the way of the actuator and then moving the latch for the purpose described, and a power driver for operating said mechanism.

22. In a loom of the character described, a lay, carriers on the lay, each having an arm extending longitudinally of the lay; a shuttle-holder mounted to slide on the arm of each carrier; a shuttle lock and an operating member for projecting and retracting the same, carried by the holder; actuating means for the said operating member, including a bar sliding longitudinally of said carrier-arm; a longitudinally-movable member arranged to operate said bar, and mechanism for so moving said member, carried by the lay; and a power driver for operating said mechanism; said parts being so organized and arranged as to be brought into relation for transmitting motion only when the lay is retracted and the shuttle-holders are most closely adjacent each other.

23. In a loom of the character described, a lay, carriers on the lay, each having an arm extending longitudinally of the lay; a shuttle-holder mounted to slide on the arm of each carrier; a shuttle lock and an operating member for projecting and retracting the same, carried by the holder; actuating means for the said operating member, including a bar sliding longitudinally in said carrier-arm; a latch mounted on said arm normally holding said bar from movement; a longitudinally movable member having also an up-and-down motion simultaneously therewith, and mechanism for so moving said member, carried by the lay; projections on said member arranged to release the latch and move said bar; and a power driver for operating said mechanism; said parts being so organized and arranged as to be brought into relation for transmitting motion only when the lay is retracted and the shuttle-holders are most closely adjacent each other.

24. In a loom of the character described, having a lay, shuttle-carriers thereon adapted to travel toward and from each other, and shuttle holders sliding on the respective carriers; a lock on each holder, a bar mounted to slide longitudinally in each carrier, and intermediate connections operated by motion of said bar for engaging the lock with the shuttle and disengaging it therefrom.

25. In a loom of the character described, having a lay, shuttle-carriers thereon adapted to travel toward and from each other, an arm on each carrier projecting toward the other, and a shuttle-holder sliding on each of said arms, a bar mounted to reciprocate longitudinally in each arm, and a shuttle lock operated by the movement of said bar.

26. In a loom, in combination with the shuttle-holder, a rock-shaft extending longitudinally of the holder carried in a plurality of bearings in the holder, a latch secured to said shaft intermediate and flanked by said bearings, and means for oscillating the shaft to bring the latch into and out of engagement with a shuttle.

27. In a loom of the character described, in combination with the shuttle-holder, a rock-shaft carried by the holder, a latch secured thereon and oscillated thereby into and out of engagement with a shuttle, a projection on said rock-shaft, and an oscillative lever having a cam portion engaging said projection for rocking the latter and the shaft.

28. In a loom of the character described, in combination with a shuttle-holder, a rock-shaft carried by the holder, a latch secured thereon and oscillated thereby into and out of engagement with a shuttle, a projection on said rock-shaft, an oscillative lever having a slot into which said projection extends and whereby the latter, the shaft and the latch are rocked, and resilient means for retaining said oscillative lever in either of its limits of swing.

29. In a loom of the character described, in combination with a shuttle-holder, a lock mounted movably on said holder, an oscillative lever, connections between said lever and lock whereby oscillation of the former causes alternate engagement and disengagement of the latter with the shuttle, driving means for engaging and swinging said lever, and means independent of said driving means for retaining the lever in either of its extreme positions.

30. In a loom of the character described, in combination with a shuttle-holder, a rock-shaft at the side of said holder, a latch secured thereto, an operating lever pivoted to oscillate transversely of the rock-shaft and having a slot, and a lateral projection on the shaft entering said slot, serving to rock the latch into and out of the interior of the holder when the lever is oscillated.

31. In a loom of the character described, in combination with the shuttle-holder, a lock mounted movably thereon, an oscillative operating lever connected with the lock so as to swing the same into and out of the holder, when oscillated, and a spring bearing against the lever, so located as to exert its force on different sides of the pivot of the lever when the latter is at the limits of its swinging movement, to hold the lever in each of its extreme positions.

32. In a loom of the character described, in combination with the shuttle-carrier and the relatively movable holder, a lock and an oscillative lever connected to advance and retract the lock mounted on the holder; a bar movable bodily in the carrier, and an arm mounted pivotally on the carrier, oscillated by movement of said bar and arranged to engage said oscillative lever when the carrier and holder are in a predetermined relative position.

33. In a loom of the character described, in combination with the shuttle carrier and the relatively-movable holder, a lock and an oscillative lever connected to advance and retract the lock mounted on the holder; a bar movable bodily in the carrier, an arm mounted pivotally on the carrier, oscillated by movement of said bar and arranged to engage said oscillative lever when the carrier and holder are in a predetermined relative position, a projection on said bar by which the same may be reciprocated, and a latch mounted on the carrier arranged to engage said projection and prevent movement of the bar.

34. In a loom of the character described, in combination with the lay, the shuttle-carrier, and means for moving the shuttle-carrier along the lay, and the shuttle-lock, mechanism carried by the lay for operating said lock, consisting of a reciprocable bar arranged to bring the lock into holding and releasing position respectively on alternate reciprocations, step-by-step operating gearing timed to move the bar from one limit to the other at each step, and a driver arranged to engage said gearing and move the same a step when the lay is in one position.

35. In a loom of the character described, in combination with the lay, the shuttle-carrier, and the shuttle-lock, a bar extending and reciprocable longitudinally of the lay, links connecting said bar thereto, whereby an up-and-down motion is given to the bar at each reciprocation of the bar, mechanism for moving the bar from one extreme position to the other upon each return movement of the lay, and connections operated by the bar during the said movements thereof for actuating the shuttle-lock.

36. In a loom of the character described, in combination with the lay, the shuttle-carrier, the lock actuator, and the shuttle-lock, mechanism carried by the lay for operating said lock, consisting of a bar reciprocable longitudinally of the lay and connected thereto so as to rise and fall during each reciprocation, notched projections on the bar for moving the lock actuator of the carrier, and mechanism for moving the bar from one extreme position to the other after each return of the lay.

37. In a loom of the character described, in combination with the lay, the shuttle-carriers, the shuttle lock and the lock-operating mechanism on the carriers and lay, intermittently operating gearing for actuating said mechanism, consisting of a constantly rotating arm and a wheel connected to move said mechanism by its rotation, having projections adapted to be engaged and turned by said arm at each approach of the lay toward the same.

38. In a loom of the character described, in combination with the lay, the shuttle-carriers, the shuttle lock, and the lock-operating mechanism for the carriers and lay, intermittently operating gearing for actuating said mechanism, consisting of a constantly rotating arm, a wheel connected to move said mechanism by its rotation, having projections adapted to be engaged and turned by said arm at each approach of the lay toward the same, and a lock normally engaging one of said projections to hold said wheel stationary, but arranged to be disengaged therefrom by rotation of said arm.

39. In a loom of the character described, the combination with the lay and shuttle-carriers thereon, of connections interposed between the lay and a fixed part of the frame, on the opposite side of the lay from the breast-beam, consisting of levers pivotally connected to a transverse bar of the frame and having cam slots inclined to the motion of the lay, links joining said levers with the carriers, and projections on the lay entering and sliding in the cam slots in the levers, so as to cause oscillation of the levers.

40. In a loom of the character described, the combination with the lay and shuttle carriers thereon, of connections interposed between the lay and a fixed part of the frame, on the opposite side of the lay from the breast-beam, consisting of levers pivotally connected to a transverse bar of the frame and having cam slots, links joining said levers with the carriers, and projections on the lay entering the cam slots in the levers, so as to be capable of sliding therein, said slots being arranged transverse to the motion of the lay so as to cause oscillation of the levers, but having portions in the line of such motion, whereby a limited motion of the lay is permitted while the levers remain stationary.

41. In a loom of the character described, in combination with the lay, longitudinal supporting rods and guides mounted adjacent the ends thereof, and shuttle-carriers mounted to slide on said rods and between said guides.

42. In a loom of the character described, in combination with the lay, guides on the upper side thereof, shuttle-carriers engaged with and steadied by said guides, supporting rods beneath the guides, and collars secured to the carriers embracing said rods.

43. In a loom of the character described, in combination with the lay, guides on the upper side thereof, shuttle carriers each engaged at one end with and steadied by said guides, supporting rods beneath the guides, and a collar connected with each carrier at a distance from the guided end embracing one of said rods and supported thereby.

44. In a loom of the character described, in combination with the lay and shuttle-carriers, each of the latter having an arm, of shuttle-holders movably supported on, and guided by, the arms of the carriers, a rock-shaft and arm held by each carrier and connected with the respective holder, a curved guide rising above the lay, and an upward arm attached to said rock-shaft having a pin engaged with said guide, the latter extending downward and inward from the end toward the center of the lay.

45. In a loom of the character described, in combination with the shuttle-holder, a lock mounted movably thereon, an oscillative operating lever connected with the lock so as to swing the same into and out of the holder, when oscillated, and a movable plate held under tension and provided with means for preventing backward movement of the lever when the latter is at the limits of its swinging movement, to hold the lever in each of its extreme positions.

In testimony whereof I have hereunto set my hand in presence of two subscribing witnesses.

JOSEPH A. GENDRON.

Witnesses:
MAUD I. DIONNE,
AGNES B. DUNCKLEE.